(12) United States Patent
Hughes

(10) Patent No.: US 6,524,477 B1
(45) Date of Patent: Feb. 25, 2003

(54) GRAVITY-FLOW FILTRATION CARTRIDGE FOR THE REMOVAL OF MICROORGANISMS AND/OR OTHER CONTAMINANTS

(75) Inventor: Douglass E. Hughes, Boulder, CO (US)

(73) Assignee: Rich Buhler, Longmont, CO (US)

( * ) Notice: Subject to any disclaimer, the term of this patent is extended or adjusted under 35 U.S.C. 154(b) by 0 days.

(21) Appl. No.: 09/130,768

(22) Filed: Aug. 7, 1998

Related U.S. Application Data

(63) Continuation-in-part of application No. 08/919,552, filed on Aug. 27, 1997, now abandoned.

(51) Int. Cl.[7] .............................................. B01D 24/00
(52) U.S. Cl. .................... 210/282; 210/455; 210/472; 210/474; 210/477; 210/484; 210/496; 210/501; 210/502.1; 210/503; 210/510.1
(58) Field of Search ............................. 210/282, 510.1, 210/484, 502.1, 198.1, 232, 501, 455, 472, 474, 477, 496, 503

(56) References Cited

U.S. PATENT DOCUMENTS

| | | | |
|---|---|---|---|
| 133,720 A | * 12/1872 | Pettijohn | 210/510.1 |
| 4,895,648 A | 1/1990 | Hankammer | 210/188 |
| 4,969,996 A | * 11/1990 | Hankammer | 210/282 |
| 5,609,759 A | * 3/1997 | Nohren, Jr. et al. | 210/282 |
| 5,637,214 A | * 6/1997 | Kahana | 210/282 |
| 5,855,160 A | * 1/1999 | Shen | 99/279 |
| 6,238,552 B1 | * 5/2001 | Shannon | 210/282 |

* cited by examiner

*Primary Examiner*—Robert Popovics
(74) *Attorney, Agent, or Firm*—Steven C. Petersen; Hogan & Hartson, LLP

(57) ABSTRACT

Embodiments of a gravity-flow filter cartridge are described for removing water-borne parasites, and other contaminants such as chlorine, lead, and organics from water. The filtration cartridge includes a liquid porous plastic filter, which has pore diameters large enough to let water pass at acceptable flow rates under only the force of gravity, while the matrix creates a tortuous path which traps parasites and other microorganisms that are typically in the approximately 3–9 micron size range. The filter may include interstitial carbon and other additives to improve performance. The filter may be shaped to provide a large surface and an optimized wall thickness for providing beneficial filter capacity and water flow rate.

23 Claims, 11 Drawing Sheets

GRAVITY-FLOW FILTRATION CARTRIDGE FOR THE REMOVAL OF MICROORGANISMS AND/OR OTHER CONTAMINANTS

CROSS-REFERENCE TO OTHER APPLICATIONS

This patent application is a continuation-in-part of U.S. patent application Ser. No. 08/919,552, filed Aug. 27, 1997 and entitled Gravity-flow Water Filter Cartridge For Pathogenic Microorganisms.

BACKGROUND OF THE INVENTION

1. Field of the Invention

This invention relates to a filtration cartridge for a gravity-flow water system. More specifically, this invention relates to a gravity-flow filtration cartridge for use in a home, office and outdoors that features a complex, tortuous path matrix which removes microorganisms, such as Cryptosporidium and *Giardia lamblia*, in addition to removing heavy metals, chlorine, taste and odor from water.

2. Description of the State of Art

Water quality in industrialized nations has recently become a major concern for many people primarily because of health concerns due to trace quantities of heavy metals, such as lead, copper and zinc, but also in-part because of odors and the taste of chlorine in water. While legislation in the United States has eliminated, from new construction, materials that leach lead and other heavy metals into water, the early nineties saw the discovery that chlorine-based chemicals, used to treat America's water supplies, may also pose serious health risks. In 1995 the non-profit National Resources Defense Council found that there may be as many as 7 million cases of drinking water-related illnesses each year in the United States, with about 1,200 deaths. In 1993 and 1994 alone, roughly 53 million Americans, one in five, drew their drinking water from systems that violated Environmental Protection Agency regulations. Chlorine in tap water has been reported to be linked to chemical bi-products, called trihalomethanes (THMs) that have proven to be carcinogenic when consumed over long periods of time. Trihalomethanes are now directly linked to colon and bladder cancer in humans. Another report by Dr. Charles Gerba concludes that 39% of municipally treated tap water is contaminated with either *Giardia lamblia* or Cryptosporidium, or both. Cryptosporidium, a pathogenic protozoan microorganism, was responsible for outbreaks in Milwaukee and Las Vegas in the early 1990s. In the Milwaukee outbreak of Cryptosporidiosis, 400,000 people were sickened, as many as 4,000 people were hospitalized, while over 100 people died as a direct result of drinking microbiologically contaminated tap water. These discoveries, combined with growing public acceptance of bottled water and water filtration systems, have caused tremendous growth in the sale of both bottled water and the further development of water filters for the home, office, and outdoors. Today, a growing number of people choose to use bottled water or use a water filtration device to filter their drinking and/or cooking water.

Several types of gravity-flow filtration systems have been developed to address the various health concerns addressed above. The most popular styles being the pour-through carafe or the refrigerator water tank, which have been developed by such companies as Clorox's™ BRITA™, Recovery Engineering's PUR™, Water by Culligan™, Rubbermaid™ and Glacier Pure™. Such systems include an upper reservoir for receiving unfiltered water, a lower reservoir for receiving and storing filtered water, and a granular activated carbon filter with an inlet at its top and outlet at its bottom which allows water to flow from the upper reservoir to the lower reservoir. The pour-through carafe is sized to be handheld, holds about two liters of water, and may be tipped for pouring filtered water, as in a conventional pitcher or carafe. The refrigerator tank system is typically a larger rectangular tank with a spigot for draining filtered water into a glass or pan. Both the carafe or tank designs use gravity to cause the unfiltered water in the top reservoir to flow down through the filter cartridge and into the lower reservoir where the filtered water remains until it is used.

The gravity-flow filtering devices, herein also referred to as "pour-through" devices, originated in Europe. Their development was partly due to there being no standard pipe thread size in Europe, making a faucet-connected filter impractical and inoperable in most cases. Introduced into Canada and then the United States in 1987, the pour-through devices have become popular in the United States because of their economy, ease of use, portability, and because they require no plumbing or other installation. The pour-through devices store easily in the refrigerator, providing accessible chilled drinking water, and they are inexpensive, which accommodates first time buyers who are trying out such devices.

The traditional filter cartridge used in pour-through devices holds a granular blended media of 20×50 mesh granular activated carbon and either an ion exchange resin most typically a weak acid cation exchange resin or a natural or artificial zeolite which facilitates the removal of certain heavy metals such as lead and copper from tap water. While weak acid cation exchange resins also reduce hardness slightly, some disadvantages are also associated: first, they require a long contact time to work properly, which limits the flow rate to about one-half liter per minute; second, they take up a large amount of space inside the filter, or about 65% of the total cubic volume, thus limiting the space available for activated carbon. For these reasons exchange resins have never been used effectively in any configuration other than a gravity flow device.

Alternate forms of lead removal are through the use of natural and artificial zeolites, commonly called sorbents. Zeolites are a natural hydrated silicate of aluminum and either sodium or calcium or both. Natural zeolites are analcite, chabazite, heulandite, natrolite, stilbite and thomsonite. Zeolites can also be produced artificially. These are made in a variety of forms ranging from gelatinous to porous and sand-like, and are used as adsorbents, drying agents and catalysts as well as water softeners. Engelhard manufactures an artificial zeolite using titanium, in which the aluminum is replaced by the titanium under a proprietary process. This sorbent is marketed as ATS™ and ATC™. Selecto Scientific also produces an activated alumina zeolite, which is marketed under the brand name Alusil. These sorbents remove heavy metals more quickly and have the advantage of taking up far less space, typically 10% to 20% of the filter volume. However, they are only rarely used in loose granular media water filters since at pH levels of 9.5 and greater they have been known to precipitate any lead they have adsorbed back into the water. This problem can be remedied, however, when used in combination with a solid carbon block or other barrier that is positioned downstream of the sorbent. As lead leaches back into the water in precipitate form, the solid carbon block physically captures the lead and will not allow it to flow through the filter device.

Another problem with lead sorbents in powdered or granular form is that they will segregate from granular activated carbon when used in loose form. This in turn cretes the potential for channeling, a process by which water channels through only a portion of the media and is never 100% exposed to all of it. The activated carbon removes most of the chlorine from ordinary tap water, thereby improving its taste, color and odor. While activated carbon will further remove organic content from water, this is typically unnecessary since chlorinated tap water is generally free of organic matter, which is oxidized off in the chlorination process. While some trihalomethanes (THMs) still show up in treated water, trihalomethanes are now strictly regulated by the EPA and are limited to permissible levels. Further, many municipalities are now using chloramines instead of free chlorine. Chloramines are known to be more stable as a disinfectant and will not produce trihalomethanes when combined with organic matter.

Although these pour-through devices have been quite effective in reducing lead to under 15 parts per billion (ppb), as well as reducing chlorine by 75% to 95%, thereby improving the taste, color and odor of tap water, most pour-through devices have not been effective in removing water-borne microorganisms such as Cryptosporidium and *Giardia lamblia*. One exception is the PUR™ Plus carafe, which does effectively eliminate Cryptosporidium as well as chlorine and lead. This method employs a pleated, hydrophilic membrane, through which water flows radially; then the water drips through a blended media for removal of other contaminants. This method is expensive, nearly doubling the cost to the consumer; and it is vulnerable to turbidity in water in which case the microscopic pores (under 3 microns absolute) can clog prematurely.

Therefore, there is a need for a gravity-flow filtration system for use in the home, office, and outdoors that can remove microorganisms as well as chlorine, and heavy metals out of tap water, well water, and lakes and streams; yet be cost effective so that most consumers can safely filter water from the tap.

SUMMARY OF THE INVENTION

Accordingly, it is a general object of this invention to provide a convenient gravity-flow "pour-through" water filtration device for municipally treated tap water as well as for water from lakes and streams, which can remove microorganisms, and specifically water-borne parasites such as Cryptosporidium and *Giardia lamblia*.

Another object of the invention is to provide a gravity-flow filtration device to further remove chlorine, heavy metals, taste, color and odor from water.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, compositions, and methods particularly pointed out in the appended claims.

To achieve the foregoing and other objects and in accordance with the purposes of the present invention, as embodied and broadly described therein, the apparatus of this invention may comprise a filtration cartridge which houses a liquid porous plastic element having an inlet side and outlet side, and pores with a mean pore diameter in the range of 10–20 microns.

BRIEF DESCRIPTION OF THE DRAWINGS

The accompanying drawings, which are incorporated in and form a part of the specification, illustrate the preferred embodiments of the present invention, and together with the description serve to explain the principles of the invention.

In the Drawings.

DETAILED DESCRIPTION OF THE PREFERRED EMBODIMENT

Figure 2:
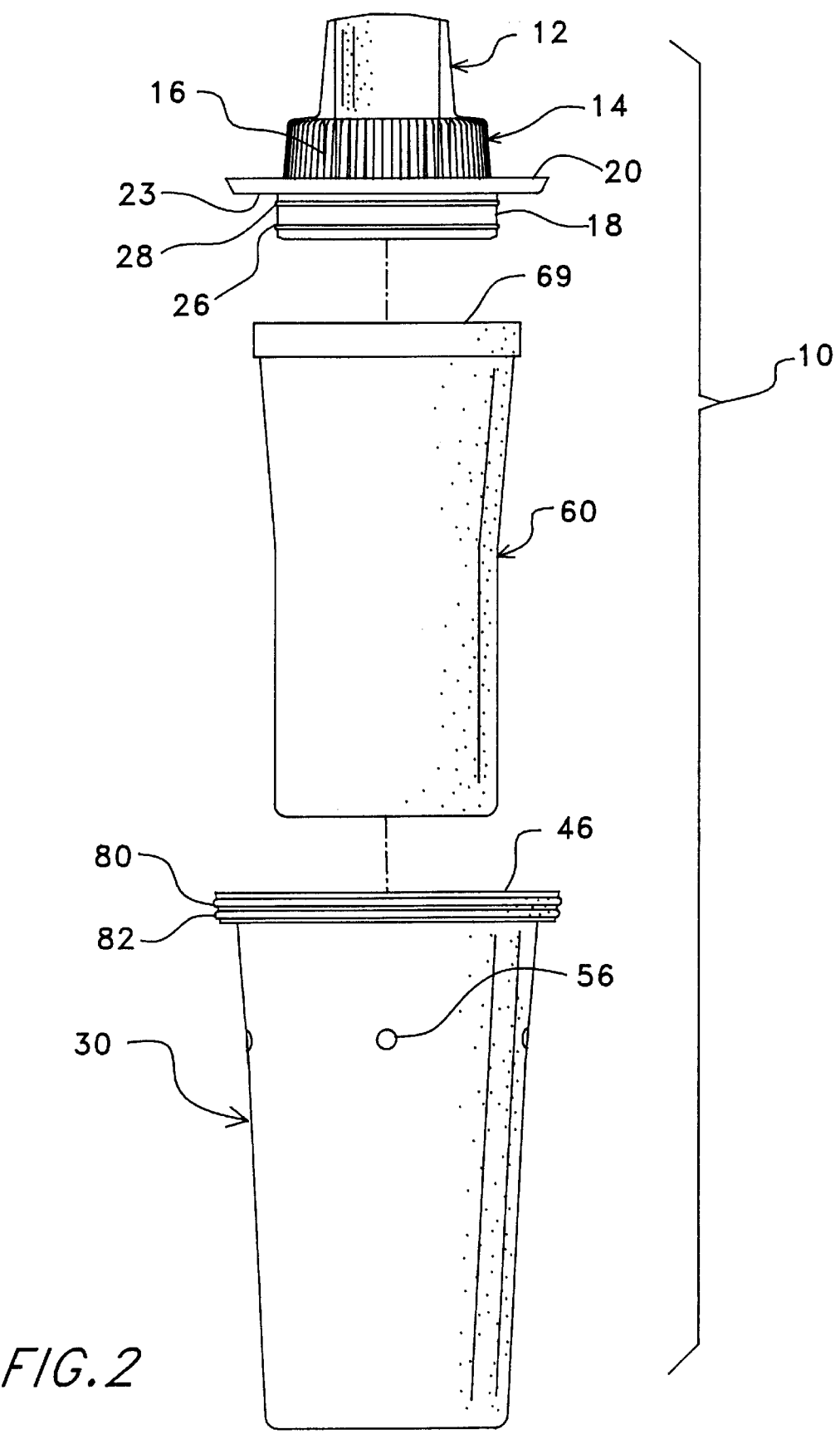
FIG. 2 is an exploded, side elevation view of the gravity-flow filtration cartridge of the present invention.
Figure 3:
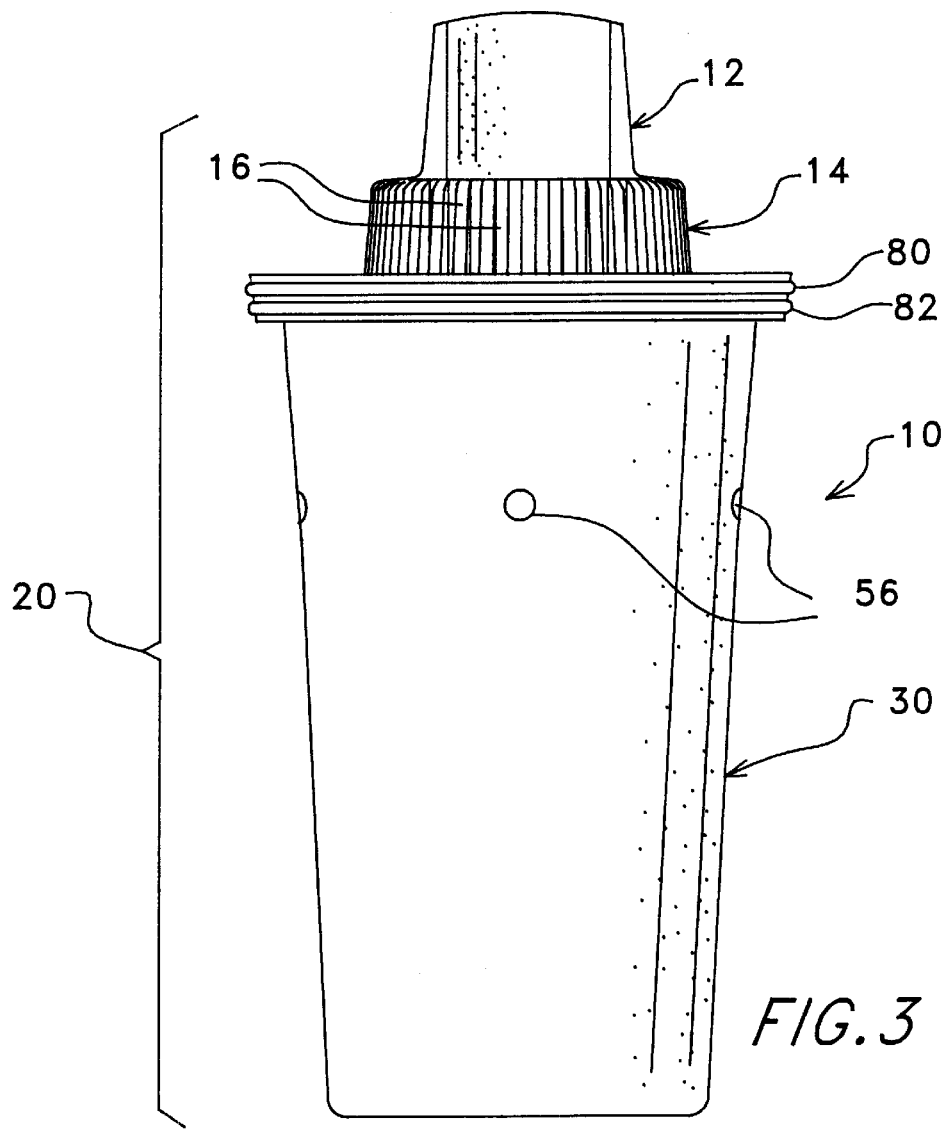
FIG. 3 is a side elevation view of the gravity-flow filtration cartridge of the present invention.
Figure 4:
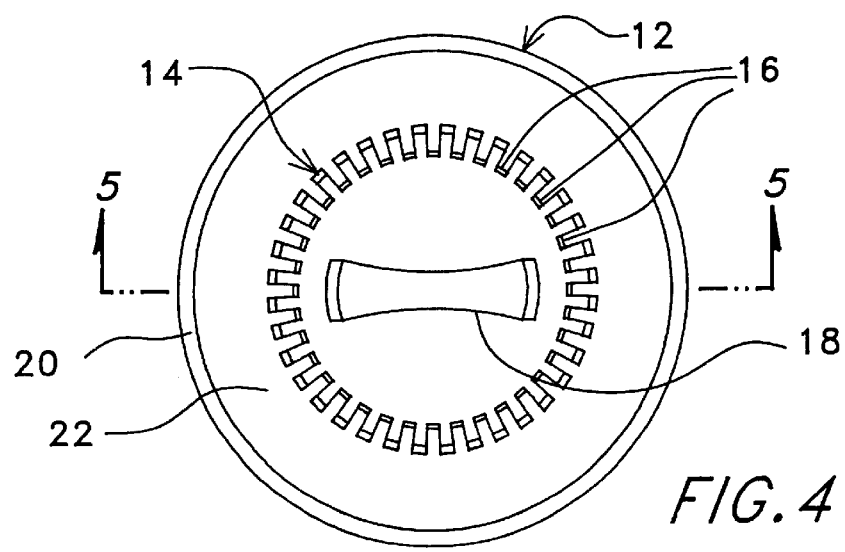
FIG. 4 is a top plan view of the gravity-flow filtration cartridge of the present invention.
Figure 5:
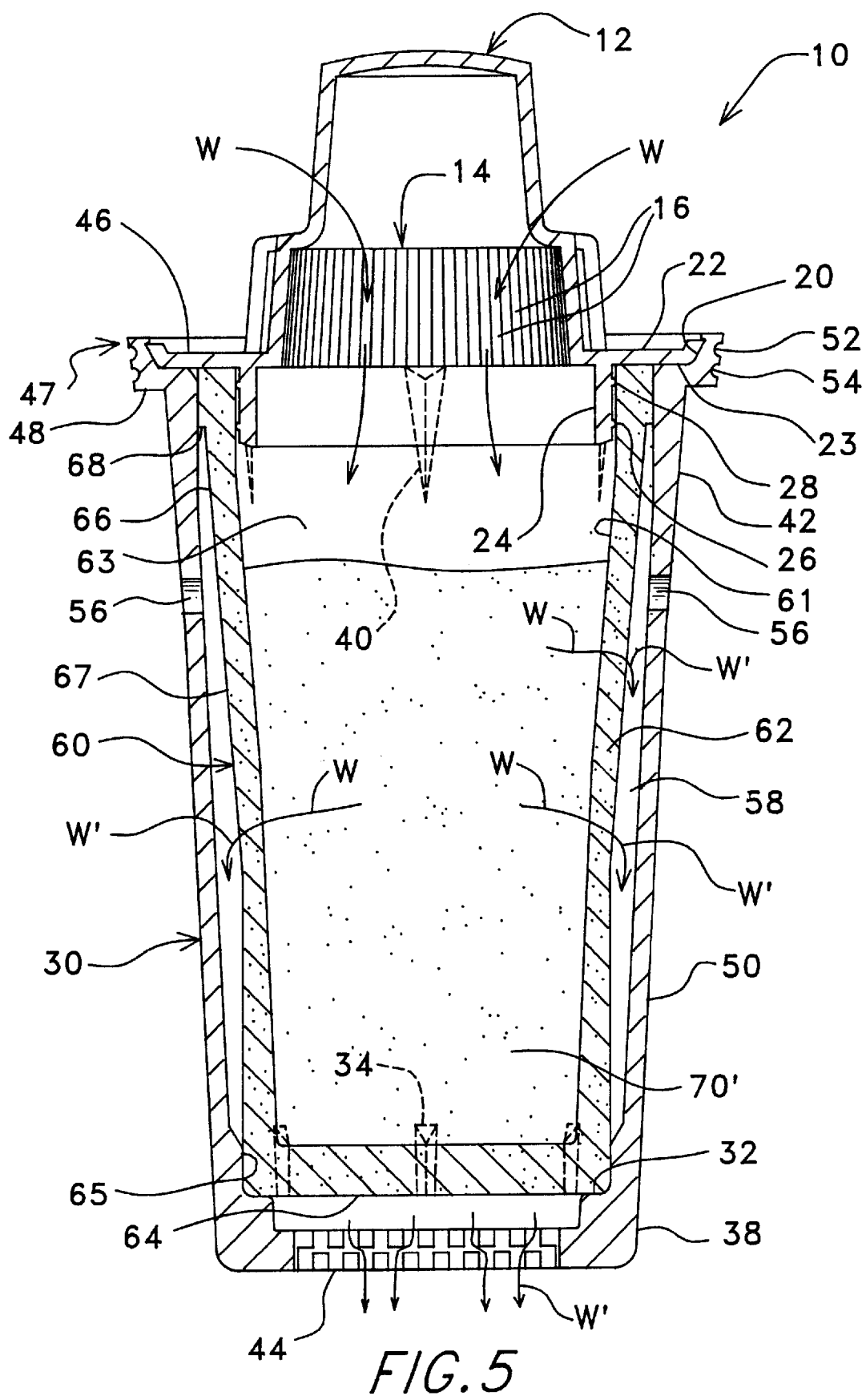
FIG. 5 is cross-sectional side elevation view of the gravity-flow filtration cartridge of the present invention, viewed along the lines 5—5 in FIG. 4.
Figure 8:
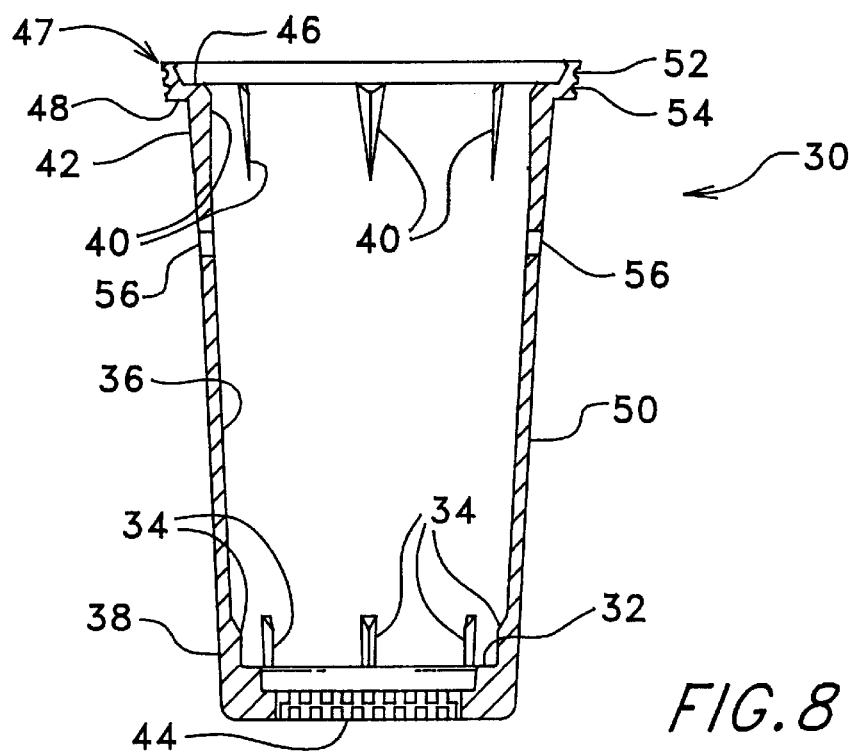
FIG. 8 is a cross-sectional, side elevation view of the container of the gravity-flow filtration cartridge of the present invention, viewed along the lines 5—5 of FIG. 4.
Figure 10:
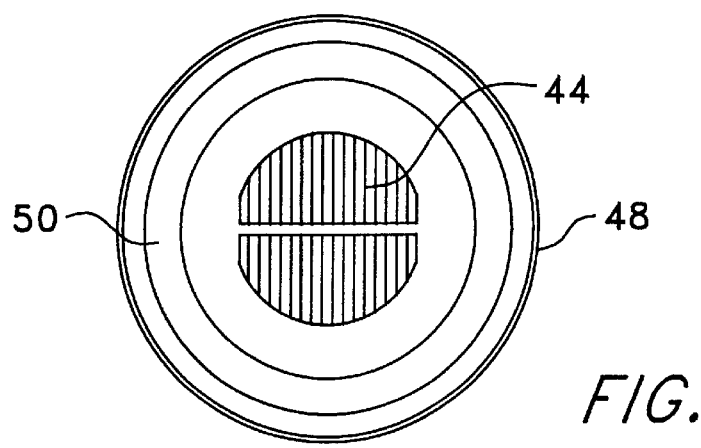
FIG. 10 is a bottom plan view of the container of the gravity-flow filtration cartridge of the present invention.

The gravity-flow filtration cartridge 10, according to this invention, is best illustrated in FIGS. 2, 3 and 5 and comprises a cover 12 which reversibly or irreversibly engages container 30 thereby forming a housing assembly 20 which contains and positions filter cup 60. Each individual element comprising filtration cartridge 10, that is, the filter cup 60, container 30 and cover 12 are shown separated from each other in FIGS. 6, 8 and 12, respectively, to illustrate their individual structures and will be discussed in further detail below. Essentially, filtration cartridge 10 is assembled, as best seen in FIG. 2, by inserting filter cup 60 into container 30 and then inserting the positioning ring 18 of cover 12 into the open top of filter cup 60 and affixing the lower surface 23 of flange 20 to the upper surfaces 69 and 46 of filter cup 60 and container 30, respectively.

Figure 1:
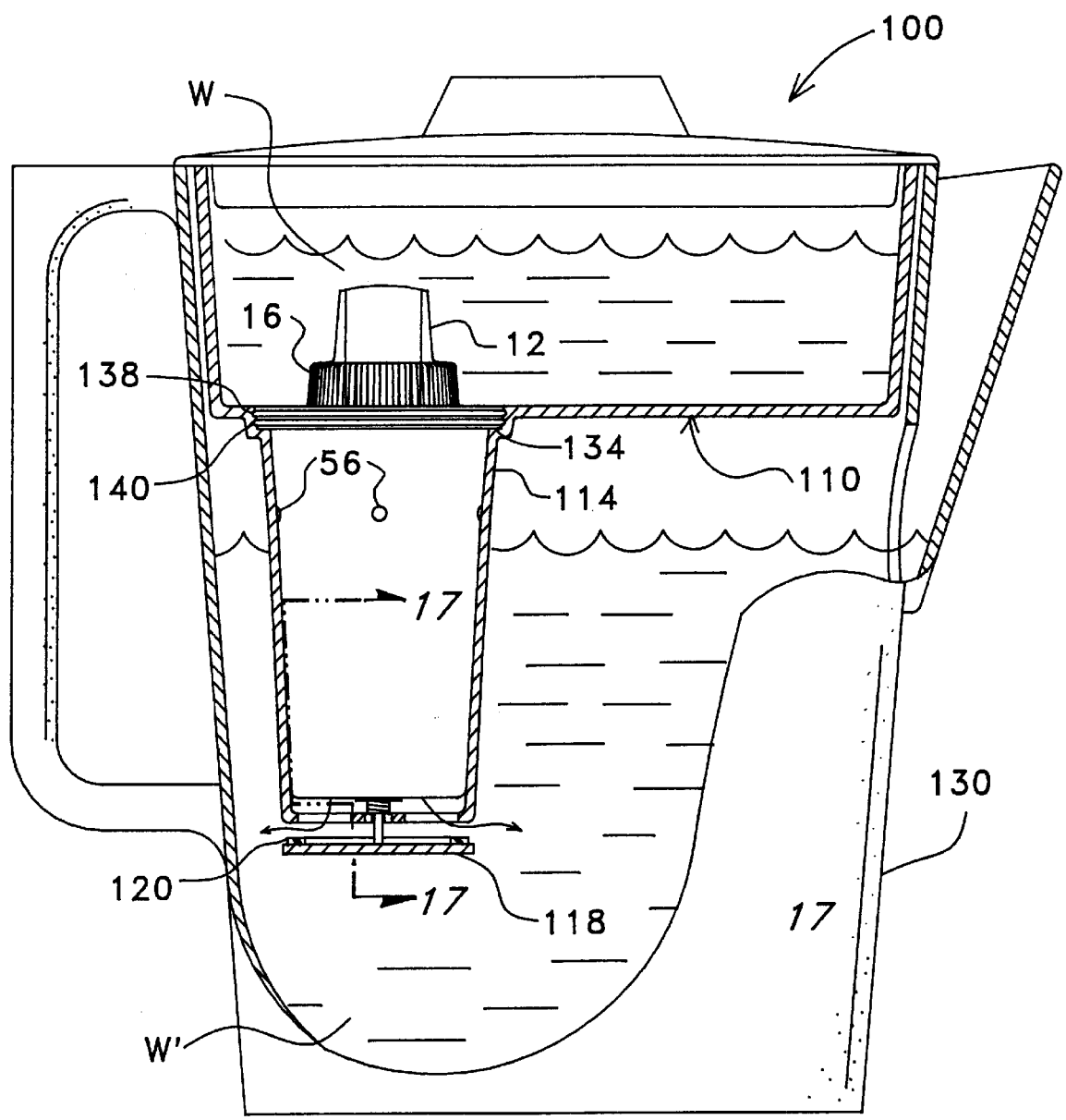
FIG. 1 is a side elevation view of the gravity-flow filtration cartridge of the present invention installed within an embodiment of a pour-through carafe with a portion of the pour-through carafe cut away to reveal the correct installation of the filtration cartridge of the present invention.

In FIG. 1, the filtration cartridge 10 of the present invention is shown installed in a pour-through water carafe 100. Water W flowing from the upper-reservoir 110 to the lower reservoir 130 is channeled through slits 16, located on cover 12, directly into the interior 63 of filter cup 60, see FIG. 5, whereupon the water W seeps through the porous walls 62 and 64 of filter cup 60 thereby filtering out inorganic and organic contaminants. The filtered water W' flows into inside cavity 58 and out through the bottom 44 of container 30 into lower reservoir 130. Although a pour-through carafe has been used to illustrate the filtration cartridge 10 of the present invention, it is to be understood that any water pitcher, bottle, carafe, tank, or other gravity-flow filtration device could be used in combination with this invention, thus, this invention should not be construed as being limited in scope to only filtering water in pour-through carafes.

Figure 6:
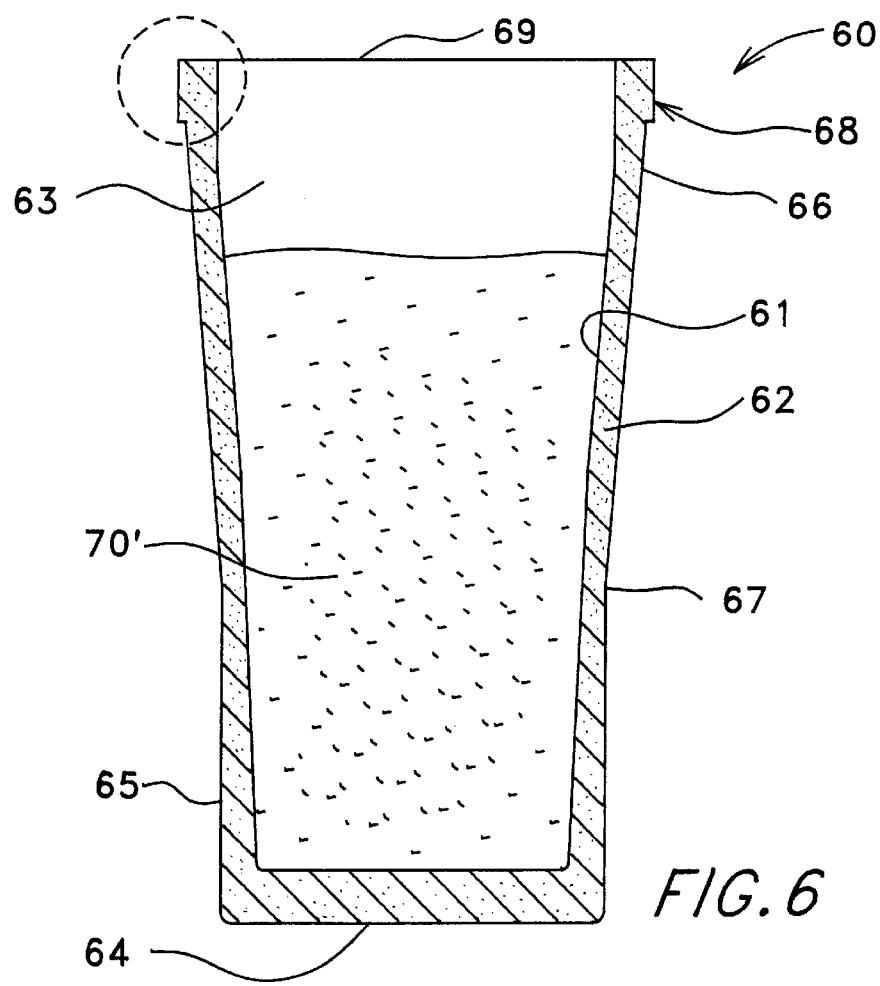
FIG. 6 is a cross-sectional side elevation view of the filter cup insert, of the gravity-flow filtration cartridge of the present invention, containing granular filter media viewed, along the lines 5—5 in FIG. 4.
Figure 7:
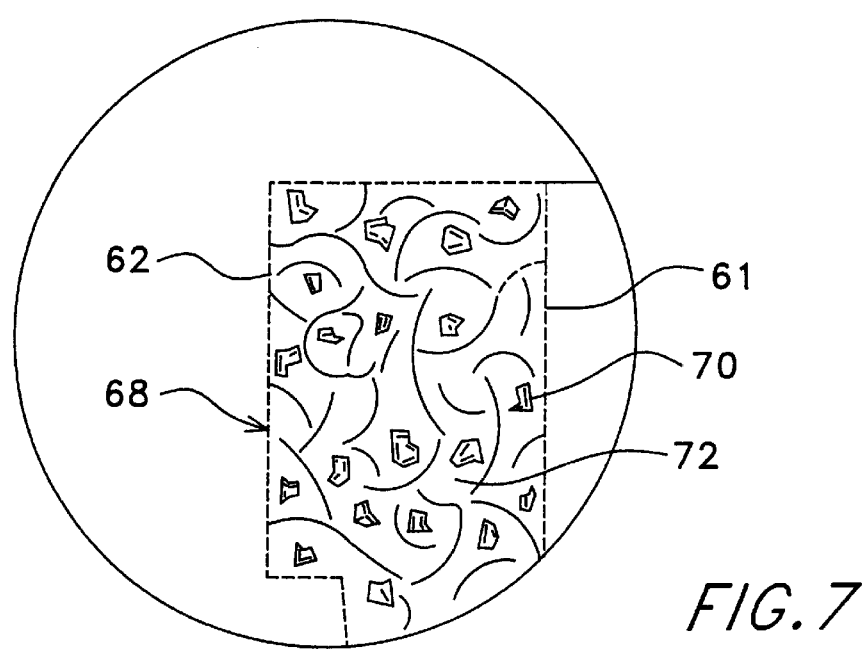
FIG. 7 is a close-up view of a portion, circled in dashed lines, of the filter cup insert wall of FIG. 6.
Figure 9:
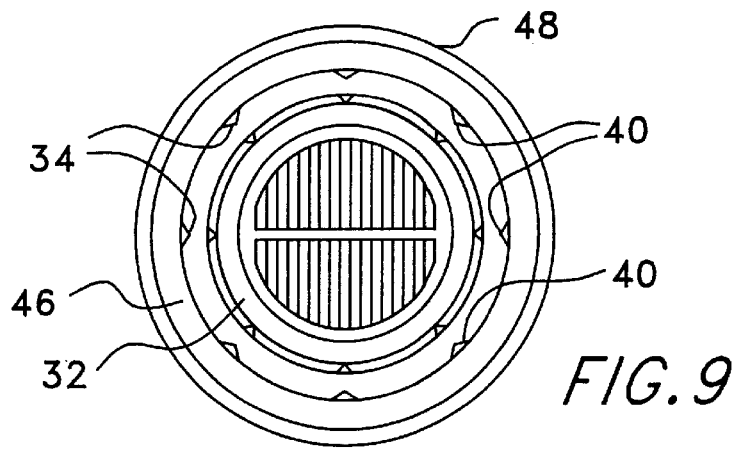
FIG. 9 is a top plan view of the container of the gravity-flow filtration cartridge of the present invention.

Referring now to FIGS. 6 and 7, the filter cup 60 is preferably, but not necessarily molded from a porous plastic material in combination with a fine granular media 70, as discussed in detail below, and includes a generally cylindrical shape, preferably having a vertical, but slightly tapered concave sidewall 62, a bottom 64, a lower end 65, and an outwardly protruding flange 68 around its upper end 66. The outside diameter of the cylindrical midsection 67 is thus smaller than the outside diameters of the upper and lower ends 66 and 65, respectively, so that an inside cavity 58, shown in FIG. 5, is defined outside the cylindrical midsection 67, and between the upper and lower ends 66 and 65 when filter cup 60 is positioned within container 30. In the alternative sidewall 62 may be straight.

The preferred sidewall 62 and bottom 64 of filter cup 60 are in the range of 0.15–0.5 inches in thickness, and most preferably in the range of 0.2–0.25 inches in thickness. This surprisingly thin wall, in combination with a median p or e diameter in the range of 10–20 microns in diameter and preferably in the range of 15 microns results in an effective screening of microorganisms, while also creating a low pressure drop and desirable water flow-rate. Preferably, the filter cup 60 sidewall 62 is slightly thinner near its upper end 66 than near its lower end 65. The outer and inner diameters of the filter cup 60 may decrease slightly near the lower end 65 in the case of a tapered concave sidewall 62, discussed above. The sidewall 62 thickness is increased near the lower end 65 in order to compensate for a slightly-increased head of water near the lower end 65 during use, thereby achieving, a more even flow of water W through the upper and lower ends 66, 65 of the filter cup 60.

The manufacture of filter cup 60 is achieved through the sintering of powdered or granulated polymer(s), including but not limited to High Density Polyethylene (HDPE), Ultra High Molecular Weight Polyethylene (UHMW), Polypropylene (PP), Polyvinylidene Fluoride (PVDF), Polytetrafluoroethylene (PTFE), Nylon 6 (N6), Polyethersulfone (PES), and Ethyl Vinyl Acetate (EVA). The manufacture of porous plastic is well known in the plastic art, and several formulations are available from such companies as Interflo Technologies, Inc. of College Point, N.Y., Porex Technologies of Fairburn, Ga., and Genpore of Reading, Pa. These polymers are granulated or powdered to a predetermined mesh size typically in the range of 60 microns and larger. The size and shape of the polymer or blend of polymers used is determined by the desired end product.

Due to the characteristics of these polymers and the method by which they are sintered, unique control of finished product porosity over many other filter materials is achievable. For example, a consistent manufacture of the filter cup 60 with a selected average pore size in a range of 10–20 microns in diameter, and preferably in the range of 15 microns in diameter may be achieved. The shape of the powdered granules can be spherical or wafer-like, and these in turn may be blended in differing ratios to provide various end results in the desired performance of a particular product. In some cases, where more than one polymer is used, the melting points may vary such that one polymer does not melt during the sintering process while the other more readily softens. In this case, the former provides a predictable structure of the porous plastic matrix, while the latter acts to some degree as a binder. Sometimes, more than one mesh size may be used to produce a desired result, or more than one shape is used to attain a desired feature. The interrelationship between the shapes of the polymers, their mesh size, and melting point, all determine the ultimate characteristics of the finished product. Median pore diameter of the finished product is determined by the initial mesh size of the powdered polymer before the sintering process. For example, very small polymer spheres will invariably create very small medium pore diameters, while larger spheres will create large medium pore diameters. Pore volume may be defined as that void space, which is left after deducting the volume occupied by the polymer. Pore volume generally remains constant throughout the various potential formulations, such that pore volume generally is not variable whereas pore diameter is variable.

Filter cup 60 of the present invention is preferably molded from an Ultra High Molecular Weight Polyethylene (UHMW) polymer as the base material for removal of water borne parasites, and creating a liquid porous part with a median pore size of 10 to 20 microns, and preferably about 15 microns; however, other polymers as discussed previously may also be used. Ultra High Molecular Weight Polyethylene was selected because of its specific characteristics, which lend themselves to greater control in attaining specific pore diameter. Where microbial control is the goal, the margin for error is limited. Some porous plastics are made from blends of different polymers, some of which act as binders while others provide the essential structure of the finished part. However, this introduces several ingredients to the requisite formula. The higher the number of ingredients the greater the margin for error from one batch to the next. UHMW displays the quality of being able to be sintered with other media without the need of a binder. When heated it has the characteristic of retaining its shape while simultaneously becoming tacky on its surface. This quality (tackiness) allows the powered spheres of UHMW to adhere to one another to form a solid yet porous matrix when cooled. It also will more predictably provide consistent pore diameter when blended with powered activated carbon or other water treatment media. Strict control of the particle distribution of such media combinations is paramount to quality control.

Once the appropriate polymer has been selected, it is then blended with a granular media 70, such as, powdered activated carbon and/or another powered media. As each new media is introduced, its effect on the original particle distribution is evaluated and adjustments to the particle distribution can be made. Granular activated carbon is screened to a preferred mesh size of 80×325. Since there is a variance from one manufacturer to another in nominal mesh sizes, the standard 80×325 mesh referred to here uses Barnbey Sutcliffs (item #30807) standard 80×325 coconut shell formula.

The preferred blend of polymer to granular media 70, by weight, can range from 20% granular media 70 and 80% polymer, up to 50% granular media 70 and 50% polymer. A ratio of 70% polymer to 30% granular media 70 by weight was found to provide the optimal performance.

Also, as the percentage of additives to the polymer(s) increases, the less stable the molded plastic may become. Consequently, it is rare that the granular media 70 content would in any case exceed 50%. Another feature of granular or powdered activated carbon relates to the overall hydrophobicity of the finished part. Polyethylene is exceptionally hydrophobic. Activated carbon is also known for its hydrophobicity, an attribute necessary in the adsorption process in water treatment applications.

However, activated carbon is far less hydrophobic than polyethylene. Because of this it actually increases the hydrophilic quality of the part.

In the formulation process a specific mesh size of the polymer is determined. For example, where removal of Cryptosporidium is desired a 60-micron sphere of UHMW is most desirable to Do achieve a median pore diameter of 15 microns when blended with the appropriate granular media 70. Activated carbon in powdered form has been referenced here, but any media that displays the proper characteristics may be used in its place. The formula, once determined, is considered crucial since any variance in the micron size of the sintered polymers as well as the particle distribution of the blended granular media 70 will effect the characteristics of the finished, molded part. The resulting sintered part features a porosity open enough to allow water to drip through by gravity, yet contains sufficient "tortuous pathways" that the microbial challenge is effectively removed. Other porous plastic manufacturing techniques may be used, as long as the tortuous path with the prescribed pore size is produced. When the granular media 70 is granular actived carbon media three important functions are achieved: (i) an adsorbent which removes chlorine and contaminants that effect the taste and odor of tap water is present; (ii) the tortuosity of the path through which the water borne parasite must pass increases; and (iii) the pressure drop of the part is inversely proportionate to the ratio of carbon to polymer, that is, the higher the carbon content, the lower the pressure drop. 50% is ideal for pressure, but 30% is optimal for microorganisms. While the basic matrix of any porous plastic part will create a tortuous path (tortuosity), here it is significantly more tortuous as a result of encapsulating the irregularly shaped particles of powdered activated carbon in the pore volumes, thereby obstructing the channels through the porous matrix.

Further tests were performed using various formulations that included denser sidewall 62 thickness and different flow rates in applications where water pressure could be applied. It was further discovered that sidewall 62 thickness increases tortuosity, while increased water pressure inversely effects microbial retention. What remains constant is that peak performance in the removal of protozoan parasites, such as the Cryptosporidium oocyst, is achieved by maintaining a ratio of 70% of the desired polymer to 30% granular media 70 (by weight).

Since the desired performance of filtration cartridge 10 may also include the removal of lead and/or heavy metals from tap water, the performance of the filter cup 60 can be enhanced by introducing a lead reduction media such as Selecto Scientific's Alusil™ or Engelhard's ATS™ or ATS Microspheres™. In any event, the introduction of or replacement by other media rarely effects the established ratio of 70% polymer to 30% granular media 70. For example, if 20% by weight of zeolite is required for the reduction of lead, 10% by weight of powdered carbon is reduced such that the final blend of carbon to polymer maintains the desired ratio of 70% polymer to 30% blended compounds, since the zeolite is two times the density of carbon.

It should be noted that if, for example a very fine mesh compound in the range of 80×325 is used, the particle distribution of the granular media 70 should be adjusted to compensate. For example, a somewhat typical particle distribution used in testing was as follows: 80—6%; 100—4%; 140—5%; 200—16%; 325—46%; and 400—5%. Where a fine mesh additive is used, the 46%—325 would be reduced proportionately to offset the introduction of the finer additive and redistributed. Otherwise, a noticeable pressure drop begins to occur.

The sintering process involves preparing the polymer and granular media 70 to the desired ratio by weight and thoroughly blending them. Once blended they are put into a mold and heated to a desired temperature. Typically, the temperature should be in the range such that the polymer becomes sufficiently tacky yet it does not lose its shape. This can vary slightly depending upon the wall thickness of the part and specific shape of the filter cup 60. Once the heat reaches the desired temperature, the polymer becomes tacky yet does not lose its rigidity. As the now formed filter cup 60 cools, it is ejected from the mold in its final form. When sintered properly and where the ratios are optimal, the granular media 70, shown in FIG. 7, become encapsulated in the void spaces 72. This encapsulation of granular media 70 in the void spaces 72 has proven to create a tortuous path in which water W freely flows through the porous sidewall 62 while the microorganisms (not shown) are trapped within. For example, a cryptosporidium oocyst is tubular in shape, measuring about 3 microns in diameter and 6 microns in length. This irregular shape combined with the tortuosity of the myriad passages work in concert to cause the organism to become trapped such that it cannot flow through. Further adhesion to the interior of the matrix is caused by the electro-kinetic attraction between the polymer and the organism, which are oppositely charged.

The design of filter cup 60 further allows for the addition of more granular media 70 to achieve higher performance. Because the optimum ratios of granular media 70 blended with polymer, such as, UHMW polyethylene in the porous plastic matrix are inadequate to remove as desired the organic contaminants such as chlorine, the interior volume or space 63 of the filter cup 60 preferably holds an additional 25 to 30 grams of granular media 70'. This granular media 70' may be a blend of activated carbon and lead or heavy metal removal agents to further enhance the performance of the device. In the case of activated carbon, a 12×30 or 20×80 mesh carbon is most preferable since it exhibits less fines which clog the pores of the filter cup 60.

Referring now to FIGS. 8, 9, 10 and 11, the container 30 is preferably but not necessarily molded from acrylonitrite butadiene styrene plastic (ABS), other plastics well known in the plastics art that could be utilized include, but are not limited to polypropylene or high density polyethylene. Filter cup 60 is received by and positioned within container 30 with the lower end 64 of filter cup 60 resting on the lower shoulder 32 of container 30 and fitting snugly inside the protruding, vertical lower teeth 34 spaced around the inner surface 36 near the lower end 38 of container 30. Also, the filter cup 60 flange 68 fits snugly inside the protruding, vertical upper teeth 40 (FIG. 8) disposed around the inner surface 36 near the upper end 42 of the container 30. Thus, the teeth 34, and 40 grip and hold filter cup 60 in place within container 30, while leaving an inside cavity 58 between the inside surface 36 of container 30 and the outside surface 67 of filter cup 60 around a significant portion of the filter cup 60, that is, both circumferentially around the filter cup 60 and axially along the length of the filter cup 60. The bottom 64 filter cup 60 is therefore near, but preferably not touching, the bottom wall 44 of container 30, and the filter cup 60 sidewall 62 is near the inside sidewall 36, but preferably not touching the sidewall 36, except at teeth 40 and 34 located at the upper and lower ends 42 and 38, respectively. Thus, the frictional engagement of the upper and lower ends 66, 65, respectively, of filter cup 60 with the protruding teeth 40, 34, and the inwardly-tapered cup sidewall 62 provide room for filtered water W' to flow into inside cavity 58 existing between the outside surface 67 of filter cup 60 and the inner surface 36 of container 30. Inside cavity 58 is further vented by a plurality of holes 56 which exist in the upper end 42 of container 30. Thus, when filtered W' enters cavity 58 a vacuum is avoided and the water W' flows through the openings 43 in the bottom 44 of container 30 and into the lower reservoir 130.

Figure 13:
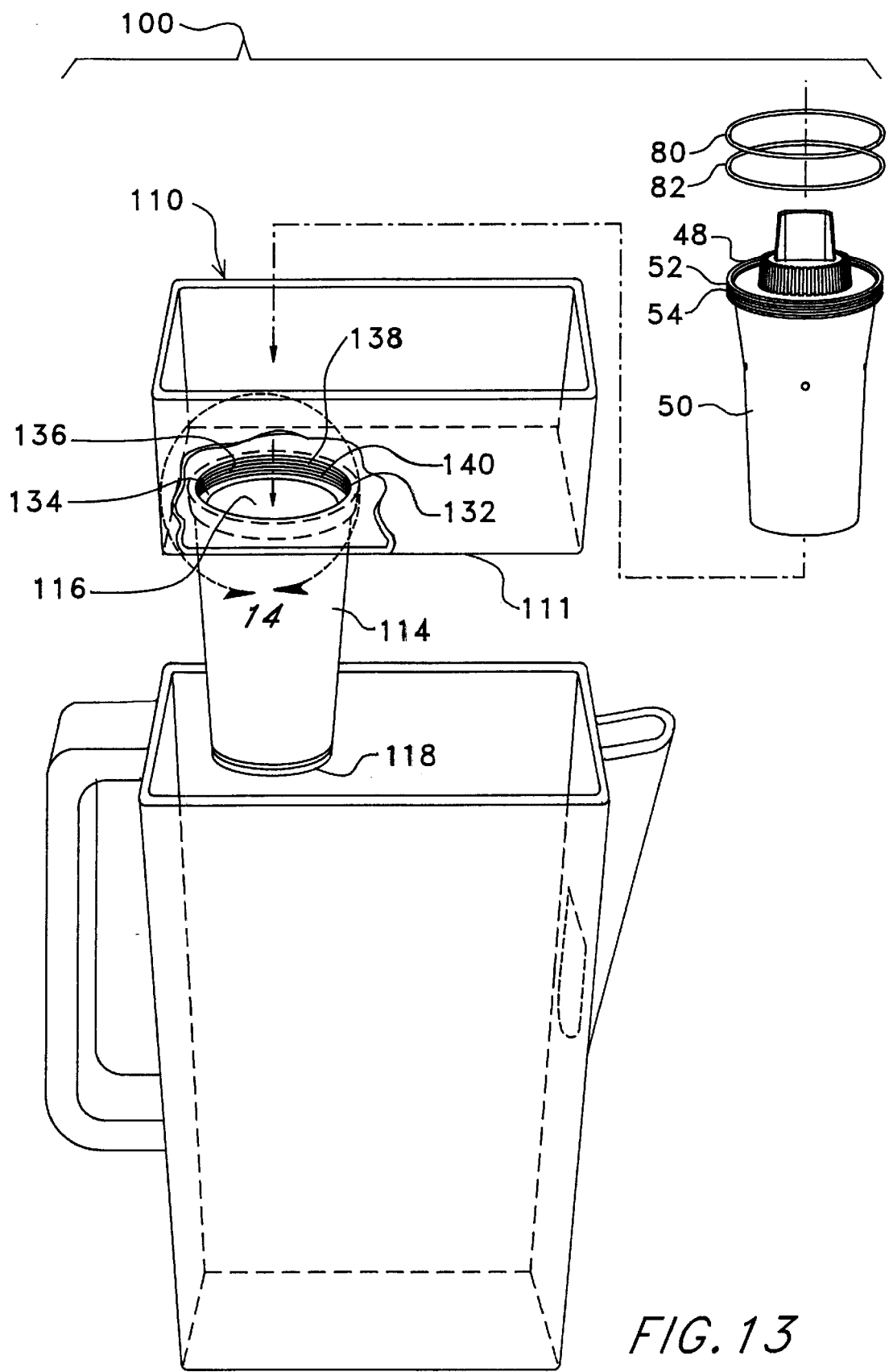
FIG. 13 is an exploded, perspective view of the gravity-flow filtration cartridge of the present invention in combination with an embodiment of a pour-through carafe.

An outwardly protruding flange 47 having a shelf or interior bearing surface 46, and two annular grooves 52 and 54 located around the outside surface of flange 47 exists at the upper end 42 of container 30 to receive O-rings 80 and 82, respectively as shown in FIG. 13 and discussed in further detail below. In the alternative, a thermoplastic rib maybe co-molded into annular grooves 52 and 54, thereby making the use of O-rings unnecessary. When filter cup 60 is inserted within container 30, the upper surface or lip 69 sits level with the interior bearing surface 46 thereby creating a larger bearing surface 74, shown in FIG. 11.

Figure 12:
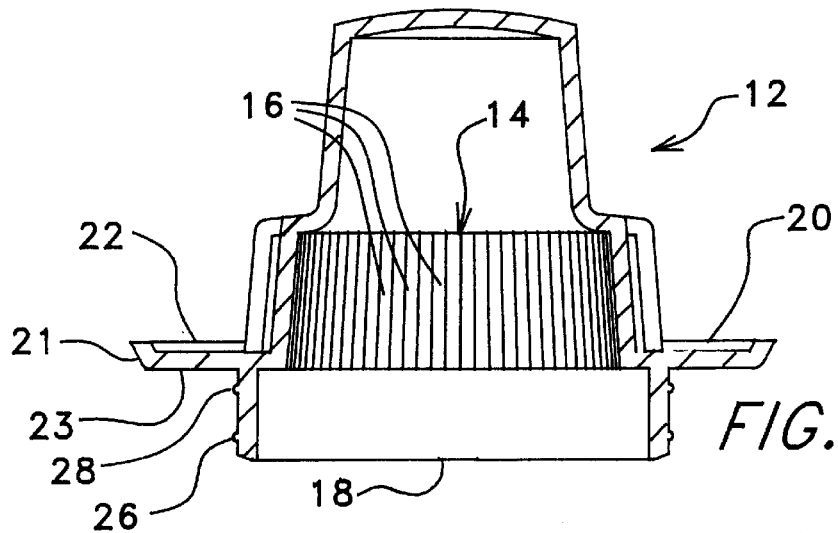
FIG. 12 is a cross-sectional view of the cover of the gravity-flow filtration cartridge of the present invention, viewed along the lines 5—5 of FIG. 4.
Figure 11:
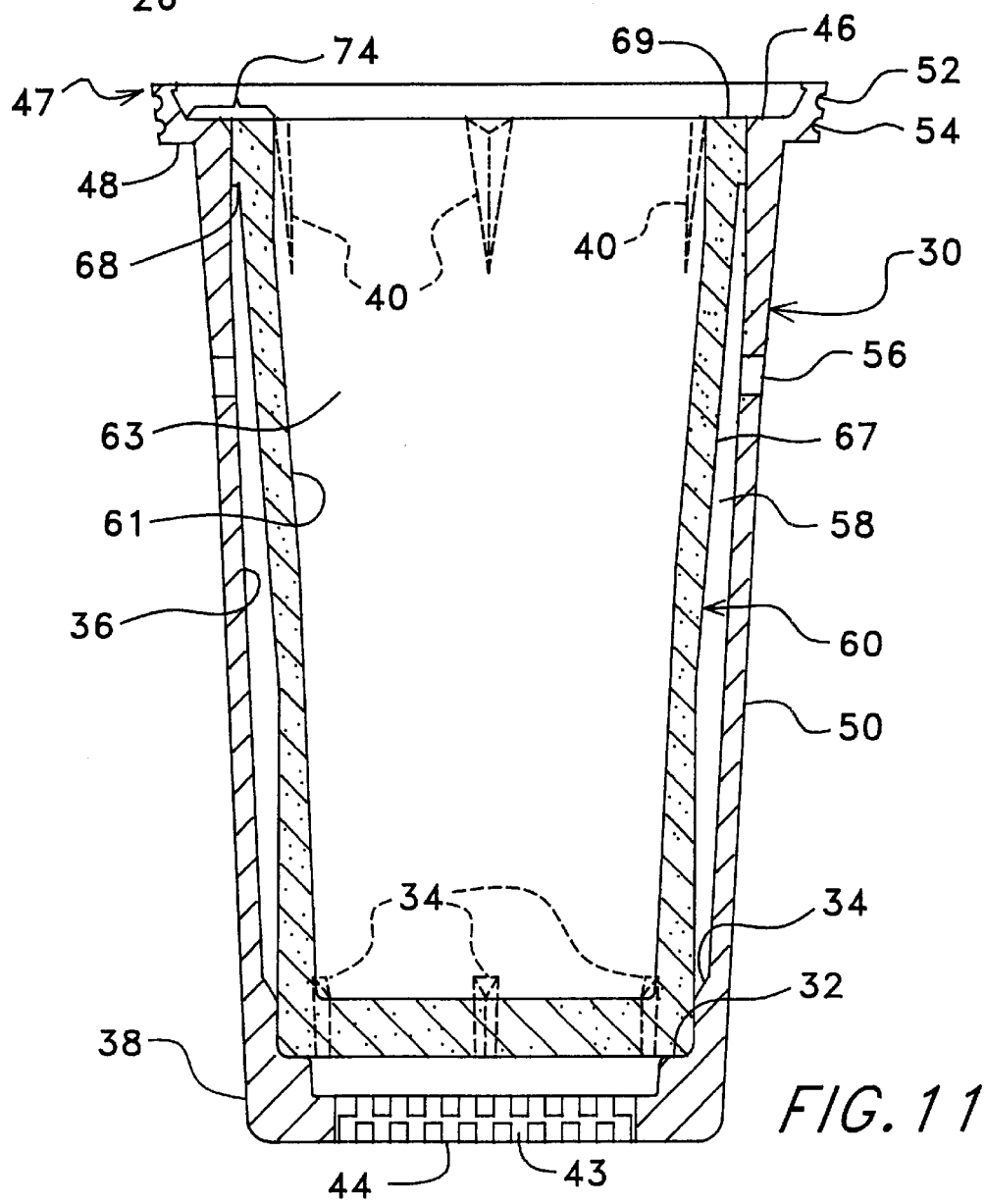
FIG. 11 is a cross-sectional side elevation view of the filter cup insert positioned within the container of the gravity-flow filtration cartridge of the present invention, viewed along the lines 5—5 in FIG. 4.

To complete the assembly of filter cartridge 10, positioning ring 18 of cover 12, shown in FIG. 12, is inserted into the open top of filter cup 60 until the lower surface 23 of flange 20 comes in contact with the larger bearing surface 74 comprising the upper surface 69 of filter cup 60 and the interior bearing surface 46 of container 30. The cover 12 is welded to the upper surface of filter cup 60 as well as to the interior bearing surface 46 to further secure it; thus, preventing any bypass of unfiltered water W. The cover 12 snaps into place at the top of the container 30, with the generally cylindrical, downwardly-protruding, positioning ring 18 of cover 12 extending into the interior space 63 of filter cup 60 and frictionally engaging the inner surface 61 of the filter cup 60 near its upper end 66 with annular ribs 26 and 28. When cover 12 is pushed down into filter cup 60, the filter cup 60 upper end 66 is compressed between the upper teeth 40 and annular ribs 26 and 28 on positioning ring 18 thereby holding filter cup 60 tightly at the top end 66. An adhesive such as a hot melt may further be applied to the large bearing surface 74 so that when the lower surface 23 of cover flange 20 comes in contact, a seal is formed, thereby further preventing water bypass.

The cover 12 cooperates with both the filter cup 60 and the container 30 to provide a proper fluid pathway and to prevent bypass of the filter cup 60. Preferably, the generally horizontal outer flange 20 of the cover 12 extends radially outward above the upper end 66 of filter cup 60 and interior bearing surface 40 of container 30. The lower surface 23 of the cap flange 20 is preferably perfectly-matched with the interior bearing surface 46 of flange 47, so that these two surfaces become sealing surfaces which mate to form a reliable seal. Also, optional attachment means may be added, such as the outer flange 20 edge snapping into a recess in the flange 47 of container 30 to further secure to cover 12 (not shown). In the alternative, external threads (not shown) could be positioned around the edge 21 of flange 20. Then cover 12 could be removably attached by screwing the external threaded portion of edge 21 into an internally threaded opening (not shown) in flange 47. A grill 14 having slit 16 is positioned around the circumference of cover 12 so that water may enter cover 12 at a predetermined point and be guided by way of positioning ring 18 into the interior 63 of filter cup 60.

Figure 14:
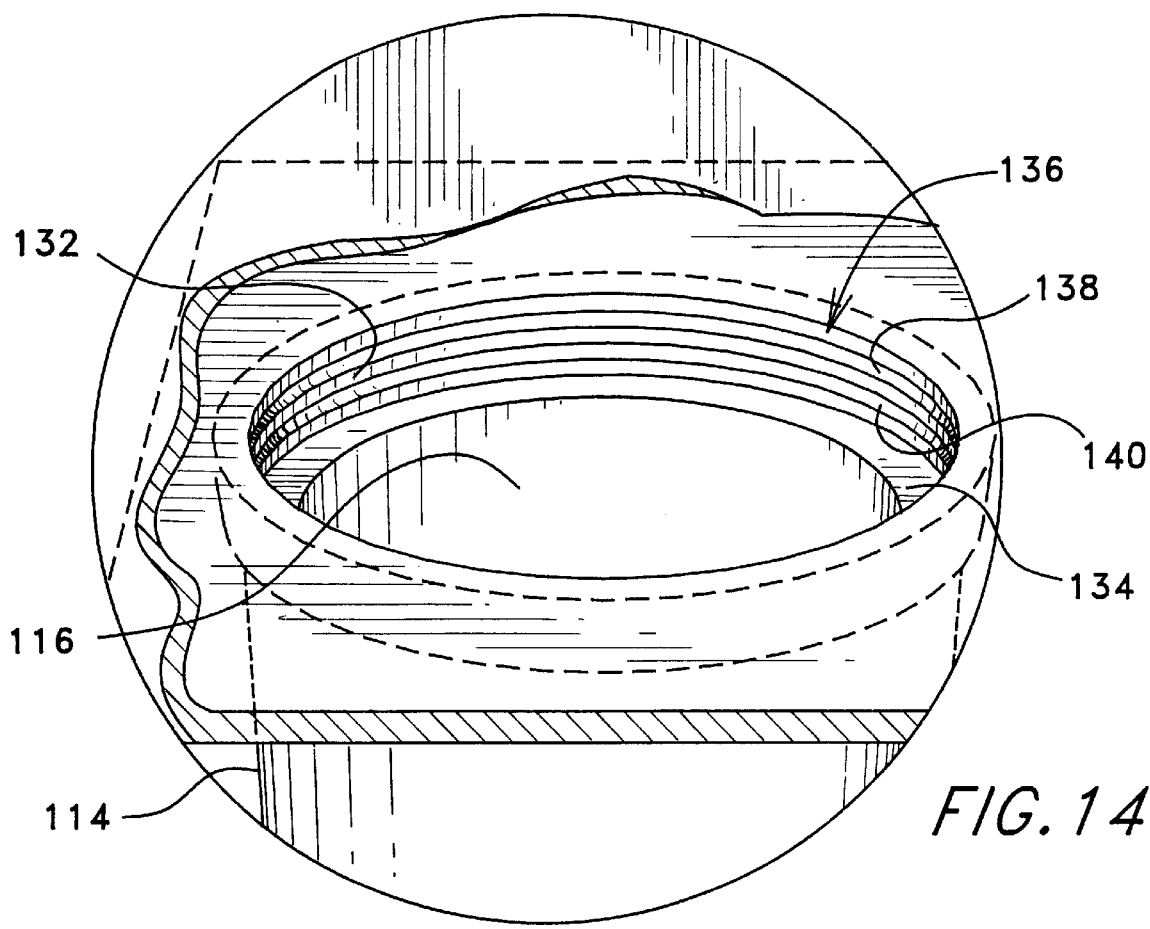
FIG. 14 is a close-up view of the upper reservoir sleeve of the pour-through carafe, viewed along the line 14.
Figure 15:
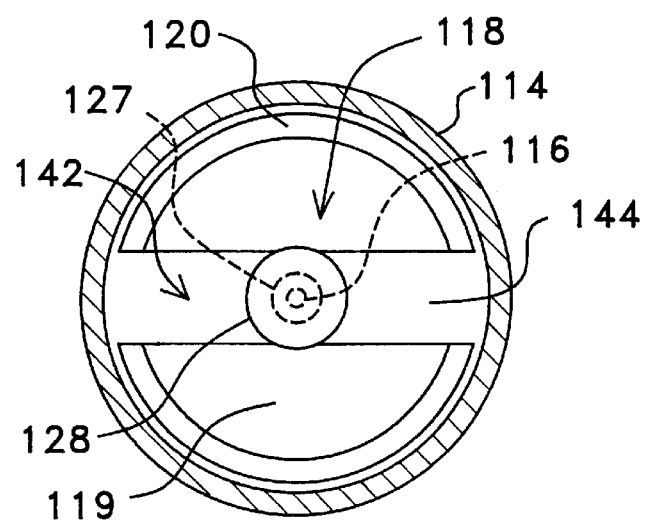
FIG. 15 is a top plan view of the upper reservoir sleeve of the pour-through carafe, viewed along the lines 15—15 in FIG. 16.
Figure 16:
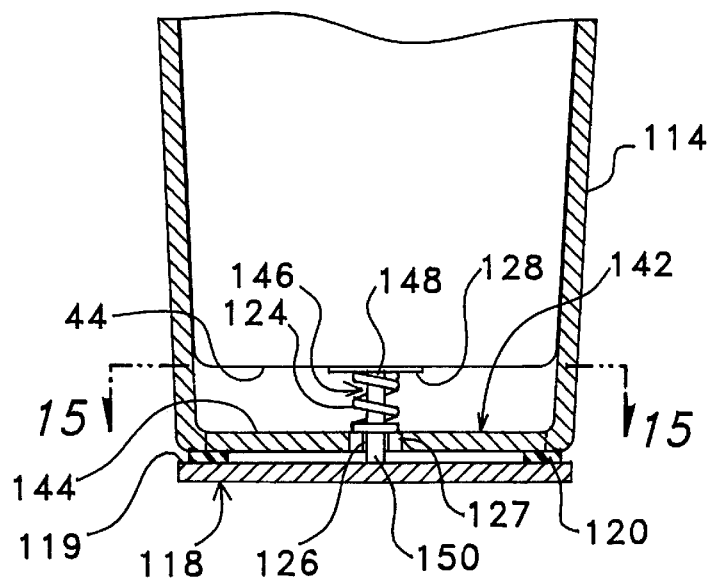
FIG. 16 is a side elevation view of the lower portion of the sleeve illustrating the effect of the improper insertion of the gravity-flow filtration cartridge of the present invention, viewed along the lines 17—17 of FIG. 1.
Figure 17:
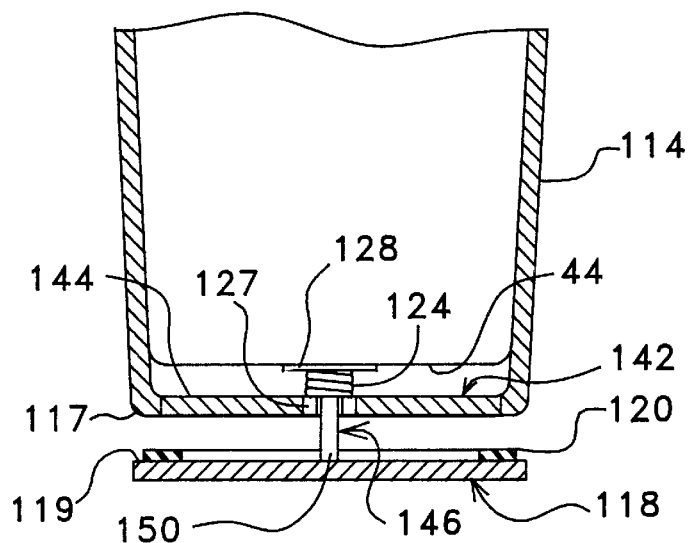
FIG. 17 is a side elevation view of the lower portion of the sleeve illustrating the effect of the proper insertion of the gravity-flow filtration cartridge of the present invention, viewed along the lines 17—17 of FIG. 1.

The upper reservoir 110 of the carafe assembly 100, shown in FIG. 13, is preferably, although not necessarily molded from a unitary piece of rigid plastic material and includes a base 111 with a sleeve 114 protruding transversely outward near one end of the base 111. Sleeve 114 has an axial bore or sleeve bore 116 extending there through, and a spring load cap 118 is attached concentrically to sleeve 114 so that it creates a seal in the closed position around the lower edge 117 of sleeve 114 (FIG. 17). The upper end of sleeve bore 116 has a larger diameter end portion 132, which results in an annular seating surface shoulder 134 extending radially outward from sleeve 114 and a sidewall 136 having annular grooves 138 and 140 for receiving O-rings 80 and 82, respectively, on flange 47 of container 30, when the filter cartridge 10 is assembled with the sleeve 114, as shown in FIG. 14. Also, when assembled as shown in FIGS. 1 and 13, the lower surface 48 of flange 47 bears on the shoulder or bearing surface 134 of the upper end of sleeve 114 and the O-rings 80 and 82 fit into annular grooves 138 and 140, respectively, thus forming a water tight seal in the base 111 of upper reservoir 110. The lower end of sleeve 114 shown in FIGS. 15, 16 and 17 is adapted with a spring loaded cap 118. Support bar 142 traverses the diameter of sleeve 114 and has wiper ring 127 positioned in an axial bore 126 for supporting the passage of rod 146 having an upper end 148 and a lower end 150 and sealing the rod 146, thus preventing the leakage of water W. Attached to the lower end 150 of rod 146 is a cap 118 having an upper surface 119 which has the same diameter as that of sleeve 114 at sleeve edge 117. The upper surface 119 of cap 118 further has a washer or seal 120 attached to its periphery so that when cap 118 is in the closed position, seal 120 presses against sleeve edge 117 forming an impenetrable barrier against liquids that may be present in the sleeve bore 116 of sleeve 114. The upper end 148 of rod 146 is positioned slideably through wiper ring 127 of axial bore 126 and a spring 124 is placed over rod 146 and further held in position by fastener 128. Consequently, the spring 124 presses against the upper surface 144 and in its biased position, shown in FIG. 16, pulls cap 118 and seal 120 up against sleeve edge 117. Therefore, in the event filter cartridge 10 is either inserted into the sleeve bore 116 improperly or not at all, cap 118 will remain in the closed position and unfiltered water being poured into upper reservoir 110 will be prevented from entering lower reservoir 130. However, when filter cartridge 10 is inserted properly into axial sleeve 116, as discussed previously, the bottom 44 of filter cartridge 10 comes in contact with fastener 128, pushing in downward motion, thus compressing spring 124 and allowing rod 122 to also slide downward through wiper 127, thereby pushing cap 118 away from sleeve edge 117, thus allowing water W' passing through filter cartridge 10 to exit axial sleeve 116 and enter the lower reservoir 130.

The preferred water flow-path is shown in FIG. 1. Water W from the upper reservoir 110 enters the cartridge water inlet, which is preferably a grill 14 having slits 16 at or near the cover 12 center. The water W flows or drips into the filter cup 60 interior space 63 and flows through the granular media 70' filling the filter cup 60 to the filter cup 60 interior surface or inlet 61. The water then flows outward through the filter cup 60 sidewall 62 to the inside cavity 58, leaving the inorganic and organic contaminants behind in the porous plastic matrix. The filtered water W' gradually seeps over the outer surface or outlet 67 of sidewall 62 and flows down to the container bottom wall 44, where it exists the container 30 through outlets 43 that is, the perforated bottom wall 43 of the container 30. With such an open-topped filter cup 60 design, air that might be present and that does not easily travel through the wet sidewall 62 material, does not become trapped inside the filter cup 60 or the container 30.

The water head pressure caused by water filling the filter cup 60, and usually also by water above the filter cup 60 in the upper reservoir 110, creates the flow of water W from the upper reservoir 110 to the lower filtered water reservoir 130, without pressurizing or pumping or other means of forcing the water besides the force of the head of water. Thus, with the invented filtration cartridge 10, water W may be filtered to remove Cryptosporidium and/or *Giardia lamblia*, and other water-borne parasites, without the complexity or expense of pumping or pressurizing equipment. Flow rate becomes a function of the total surface area of the cup and the amount of water pressure created by the head of water W above the filter cup 60. The filter cup 60 size is in the range of 4 inches long by 1.5 inches in diameter, while the amount of water W is typically 3 to 4 liters of water W in the upper reservoir 110. The resulting flow rate will be about 7 to 8 liters per hour.

The preferred filtration cartridge 10 will filter approximately three quarts of water W every 20 to 25 minutes, so long as the filter cup 60 measures 3–5 inches long by 1.5 inches in diameter with a variable wall thickness of approximately 150 to 250 thousandths of an inch. In a preferred carafe or tank, about one to two liters of unfiltered water W are added to an upper reservoir 110. The water W passes through the filtration cartridge 10 to become the filtered, parasite-free water W' in the lower reservoir 130. The user typically fills the carafe 100 and places it on a counter top or in refrigerator while the water W is being filtered. Alternate versions for outdoor use employ the same principles, but may vary in reservoir and carafe dimensions. The liquid porous filter element may be made with larger surface area to create greater flow and to accommodate more granular activated carbon for chlorine removal enhancement. The wall thickness may vary, depending upon the water head pressure of the device being used. For example, as head pressure increases there is the possibility that the microbial removal performance may diminish slightly. This can be countered by increasing the wall thickness.

In order to prime the preferred filtration cartridge 10, a special pre-wetting step is required. The pre-wetting step involves the removal of air in a vacuum and then introducing water to fill the part completely with liquid. Before this pre-wetting step, both the polymer and the granulated media 70 are hydrophobic by nature, and water rides along the porous plastic surface (known as surface tension) instead of penetrating or passing through the filtration cup 60. The air content in the open pore voids 72 also contributes to surface tension and resistance. The tiny air pockets are replaced by water W, thereby reducing the surface tension. As the granular media 70 is wetted and the air pockets inside the void spaces 72 are eliminated, surface tension is overcome and water will flow through the filter cup 60 sidewall 62 under the force of gravity. Drying out may not require a repetition of this process, but the filtration cartridge 10 is preferably stored wet inside the carafe for best performance.

In a second non-microbial embodiment the polymer, which is used to form filter cup 60, is first blended with a lead sorbent and/or a lead sorbent and a powdered activated carbon in a mesh size of 80×325 mesh or coarser. Here, the size of the polymer spheres are increased such that the median pore diameter is in a range of about 30 to 100 microns, thus allowing for a faster flow rate. Typically, it is then blended in an approximate ratio range of 50% polymer to 50% granular medias by weight to 60% polymer to 40% granular medias by weight. Where the filter cup of this embodiment has a total finished weight of 30 grams, the filter cup 60 of the preferred embodiment will have about 18 grams of polymer and 12 grams of a blend of sorbent and carbon. The sorbent carbon blend may be configured to allocated sufficient sorbent to remove a predetermined amount of lead. The presence of the granular activated carbon assists in making the liquid porous filter cup flow faster than if it were sintered without it. A coarse granular activated carbon is then placed inside the interior volume of the filter cup. Where in the prior art the weak acid cation resin left only 35% of the space for granular activated carbon, there is a three fold increase in the cubic space available for the granular activated carbon. This increase in cubic space available translates into an increase in chlorine removal capacity. Where in the prior art, a cartridge measuring 3.5" long×1.5– in diameter and filled with granular media could achieve a 160–200 liter rating using the NSF 42 and 53 protocols, here the potential capacity is 400 liters, or a two-fold increase. This is accomplished due to two primary factors. In the prior art, the available space inside the cartridge is dominated by exchange resin, leaving one ⅓ of the space available for granular carbon or some other granular media. Here the existing space is allocated 100% to granular activated carbon of a mesh size such that it will neither clog the pore of the sidewalls of the filter cup nor float back into the carafe reservoir. A 12×30 mesh is preferred, but other mesh sizes can also be made to work. Here the net effect is that while the three-fold increase in the carbon media expands the chlorine adsorption capability of the media, the sieve-like design of the liquid porous container causes water to pass through a second media bed of activated carbon and sorbent which have been sintered with the polymer. The distribution of the blended media within the matrix of the liquid porous part creates maximum interaction between the passing water and the medias. This enables the lead sorbent to achieve its maximum efficiency, while any residual chloramines in the water are removed or reduced from the water as it flows through the finely powdered carbon in the liquid porous cup.

In the design of this gravity flow device the ultimate goal is to provide both lead sorbent and granular activated carbon chlorine adsorbent in a ratio such that both expire simultaneously when tested to predetermined protocols such as NSF 42 and 53. Once the capacity of both have been determined through testing, the lead sorbent amount may be adjusted up or down. The net result is that the lead reduction and the chlorine adsorption capacities are equalized. The filter is then comprised of polymer, lead sorbent and powdered activated carbon. By gram, the powdered 80×325 mesh activated carbon is exponentially superior to the coarser 12×30 granular activated variety. The result is a two-stage gravity flow device. In the first stage the water passes through the media bed of coarser mesh granular activated carbon, which effectively removes free chlorine. As the water permeates the sidewall of the porous filter cup, it passes through either the lead sorbent or a combination of lead sorbent and finely powdered carbon. This second phase removes lead and potentially other metals, as well as polishing the water of any residual chloramines. Furthermore, in the event the pH of the water exceeds 9.5m, the accumulated lead will precipitate back into the water as a solid particle, albeit microscopically small, and will be physically retained by a physical barrier. In this case, the barrier is the sidewall of the porous filter cup.

The advantage to the consumer is significant. In the prior art, the use of granular medias limited capacity. This invention creates a device which will flow more quickly while having a capacity of more than two times that of the prior art, when displaced in a container of similar volume. Since most consumers purchase a replacement cartridge every two months, the product of this invention will enable filters to be changed just three times per year. This is both convenient and economical.

In a third embodiment, the filtration cartridge 10 is assembled as discussed above; however, the filtration cup 60 is prepared using no granular activated carbon at all. However, experiments show that the significant improvement using powdered activated carbon in the preparation can make an important difference in the performance of the element as a microbial filter. While the EPA has established testing protocols for water filters using a pesticide, over which it the legislature has given it complete authority, it is not uncommon for these EPA protocols to be observed in the testing of non-pesticide devices as well. The EPA has established that a filter must remove not less than 99.9% of Cryptosporidium and *Giardia lamblia* with an influent spike of 50,000 oocysts per ml. NSF, a non-profit third party testing laboratory in Ann Arbor, Mich. has established a turbidity test using AC fine dust which it applies to Cryptosporidium claims. This method, which actually tests for turbidity, implies that if 99.95% of AC fine dust can be removed, one can conclude that it will also remove sufficient Cryptosporidium to be safe to use. While both testing methods are acceptable, the former is more appropriate for testing a device using the tortuous path method as opposed to a device using the screening out method. This is because AC fine dust as well as latex microspheres (also used for turbidity testing) will flow through the same tortuous path which entraps parasites.

In a forth embodiment, iodine may be combined with the porous plastic to extend the microbial claims to include viruses and bacteria. Cryptosporidium and, to some extent Giardia, are exceptionally resistant to chemical disinfectants, even iodine. However, iodine can effectively deactivate most pathogenic bacteria (such as *E. coli, Klebsiella terragena*, Cholera) and most known viruses within a few seconds. Up to one half hour may be required to deactivate Giardia, and iodine has never been effective against Cryptosporidium. However, the two methods combined create a device which will be effective against all three classes of water borne pathogens. In one embodiment the iodine, which is first impregnated into an anion exchange resin, can then be sintered with a polymer to provide a liquid porous part through which water can flow easily while simultaneously picking up a controlled release of iodine. This iodine dispensing part can be in the form of a wafer or disk shaped part that is fitted into the open end of the cup. Water first is directed through the disk, which has pores as large as 100 microns to encourage flow through. As it flows then through the sidewalls of the filter cup it is free of any bacteria or viruses.

In a fifth embodiment, the filter cup 60 could be inverted, or bell shaped with the water flowing from the outside inward (not shown). Granular media would be trapped with a screen to keep it from escaping out the bottom with the flow of water. This design is more practical where the desired powdered media is so fine that it would clog the influent surface of the interior sidewall of the filter cup. In this embodiment, the filter cup would be inverted to hold additional, powdered media. A long, vertical stem with a borehole through the center would conduct trapped air back up through the reservoir.

Figure 18:
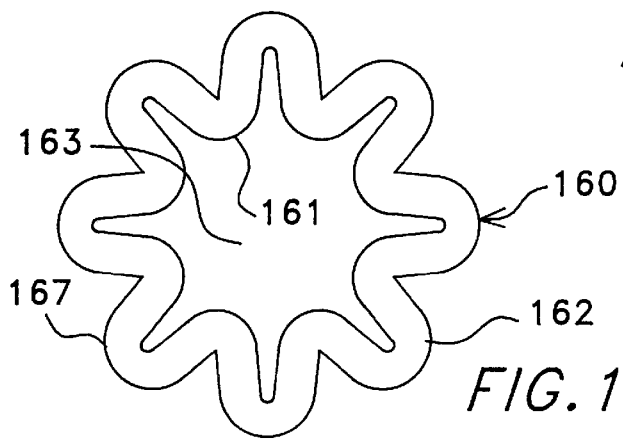
FIG. 18 is a top plan view of a filter cup insert of the present invention having a corrugate sidewall.

In a sixth embodiment, the sidewall 162 of filter cup 160, shown in FIG. 18, is pleated creating a larger surface area of inlet wall 161. Consequently, the larger surface area will allow a larger quantity of water (not shown) entering the inside space 163 to flow through sidewall 162 exiting outer surface 167.

Figure 19:
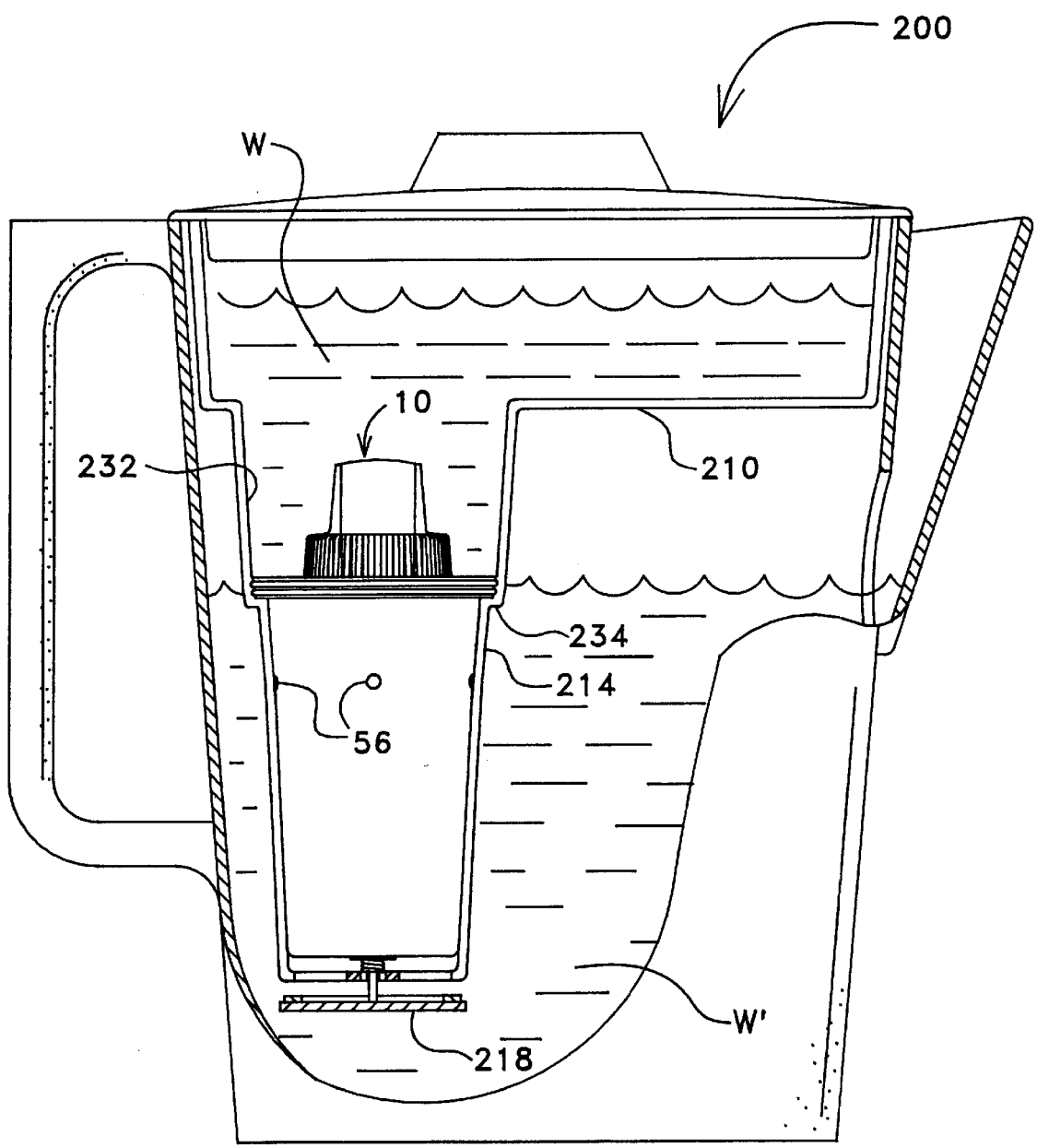
FIG. 19 is a side elevation view of the gravity-flow filtration cartridge of the present invention installed within an embodiment of a pour-through carafe with a portion of the pour-through carafe cut away to reveal the correct installation of the filtration cartridge of the present invention.

In a seventh embodiment shown in FIG. 19, seating surface 234 is recessed deeper in sleeve 214 thereby allowing a larger quantity of water to be potentially positioned directly above filtration cartridge 10. The greater the head pressure on the surface area of the filter, the faster the flow rate. Head pressure is not the total volume of water in the reservoir, however; but the total height of water directly over the filter itself. By lowering the filter toward the bottom of the carafe, it is possible to increase the depth of the water from the surface of the water to the lowest point inside the filter.

The invention is further illustrated by the following non-limited examples. All scientific and technical terms have the meanings as understood by one with ordinary skill in the art. The specific examples which follow illustrate the synthesis of representative compounds of the instant invention and are not to be construed as limiting the invention in sphere or scope. The methods may be adapted to variation in order to produce compounds embraced by this invention but not specifically disclosed. Further, variations of the methods to produce the same compounds in somewhat different fashion will be evident to one skilled in the art.

All temperatures are understood to be in Centigrade (° C.) when not specified. All solvents were distilled before use. Commercially available chemicals were used without any further purification. Various methods of purifying the products of the present invention are known and understood by those skilled in the art and the purification methods presented in the Examples is solely listed by way of example and is not intended to limit the invention.

EXAMPLES

A UHMW polyethylene powdered polymer of approximately 60 microns was selected for the test. This polymer was blended 7 parts polymer to 3 parts 80×325 mesh, powdered activated coconut shell carbon provided by Barneby Sutcliff. The two powders were blended together until a uniform distribution was achieved. They were then placed into a mold in the shape of the filter cup, heated to a point where the polymer becomes tacky and then immediately cooled. The parts were ejected from the mold. This method was repeated using ratios of polymer to powdered carbon of 8:2, 6:4 and one version which was 100% polymer with no powdered carbon. The pure polymer was assigned Formula #1, the 8:2 ratio was Formula #2, 7:3 ratio was Formula #3, and 6:4 ratio was Formula #4. Each part was submerged in water and manually tapped several times to eject air trapped inside the matrix, which is common. The parts were left to soak overnight. In large scale production, the parts would be placed in a vacuum chamber and after drawing out the air, water would be introduced so as to more effectively wet the parts. Surface tension cannot be overcome without removing the air the first time.

A test carafe with a 1-liter reservoir was set up and each of the four formulations was tested first for flow rate. Formula #1 was not tested for Cryptosporidium removal, since surface tension could not be overcome, even after removing most of the air. The table below displays the results of each of the test performed on each of the three remaining formulas. As can be seen, using live microorganisms with an influent of $3.28 \times 10^6$, Formula #3 achieved a 99.78% reduction of Cryptosporidium. Formulas #2 and #4 both failed to achieve an acceptable reduction. Testing on Formula #2 showed a removal range of 80% to 90%, or an average of about 84%. Conclusion: insufficient tortuosity. Formula #4 showed even poorer results, less than 70%. Here, flow rate was exceptional while performance was the poorest. An overload of powdered activated carbon disrupted the ability of the powdered polymer to form the desired tortuous pathways. Formula #3, however, showed both an acceptable, while slower, flow rate of about 1 liter in 25 minutes with only 1 liter of reservoir volume and removed nearly all of the Cryptosporidium oocysts from the challenge, an effluent of $9.26\times10^3$.

Although this invention has been described above with reference to particular means, materials and embodiments, it is to be understood that the invention is not limited to these disclosed particulars, but extends instead to all equivalents within the scope of the following claims.

The embodiments of the invention in which an exclusive property or privilege is claimed are defined as follows:

1. The filter cartridge for use in a gravity-flow filtration unit for removing water-borne parasites from water, the filter cartridge comprising:

a container having a top and a bottom, a housing wall with an inner surface defining an inner space, a water inlet near said top, and a water outlet near said bottom wherein said housing wall further comprises at least one opening for venting air; and a filter cup received in said container inner space wherein said filter cup has an open top end a cup wall comprising a generally vertical cup sidewall and a cup bottom wall, said filter cup wall having an interior surface defining a cup interior space and being in fluid communication with said container water inlet, and an outer surface in fluid communication with the container water outlet, said cup wall further comprises a porous plastic layer 0.25–0.50 inch thick and having pores with a median pore diameter in the range of 10–20 microns for allowing flow of water through the pores of said porous plastic layer under force of gravity and for retaining parasites in said porous plastic layer, whereby unfiltered water flows through said housing water inlet, into the filter cup interior space, through the filter cup wall, and out of the housing through the housing water outlet.

2. The filter cartridge of claim 1, further comprising a granular media received in said interior space of the filter cup.

3. The filter cartridge of claim 2, wherein said granular media in the interior space is granular, coconut shell, activated carbon.

4. The filter cartridge of claim 1, wherein said filter cup further comprises granular filter media received in at least some of the pores of said porous plastic layer.

5. The filter cartridge of claim 4, wherein said granular media received in the pores is 80×325 mesh coconut shell, activated carbon.

6. The filter cartridge of claim 1, wherein the pores of said porous plastic layer have a median pore size of 15 microns.

7. The filter cartridge of claim 1, further comprising an anti-bacterial agent in contact with said porous plastic.

8. A filter cartridge for use in a gravity-flow filtration unit for removing water-borne parasites from water, the filter cartridge comprising:

a housing having a container and a cover, wherein said container comprises a top end, a bottom end, a sidewall having at least one air vent wherein said sidewall has an inner surface defining an inner space, an opening near the container top end for access to the inner space, a water outlet near the container bottom end, and wherein said cover covers said container opening and has a central axis, an outer flange, and a water inlet perforating cover near said central axis; and an open-topped filter cup received in the inner space of said housing body inner space and having a cup wall comprising a generally vertical cup sidewall and a cup bottom wall positioned near the container bottom end, said cup wall having an interior surface in fluid communication with the cover water inlet and defining a cup interior space and an outer surface in fluid communication with said housing container water outlet, said cup wall comprising a porous plastic layer 0.15–0.50 inch thick and having pores with a median pore size in the range of 10–20 microns for allowing flow of water through the pores of said porous plastic layer under force of gravity and for retaining parasites in said porous plastic layer; and wherein said container sidewall has a plurality of protrusions extending radially inward from the container wall inner surface and contacting and frictionally engaging said cup sidewall outer surface, for securing said filter cup in said housing; whereby unfiltered water flows through the cover water inlet, into said filter cup interior space though said filter cup wall, and out of said housing through said housing container water outlet.

9. The filter cartridge of claim 8, wherein the cover comprises a means for securing the cover to said container comprising a downwardly-extending member which extends into said filter cup interior space and frictionally engages said filter cup interior surface.

10. The filter cartridge of claim 9, wherein said filter cup sidewall is generally cylindrical, and said cover downwardly-extending member is a generally cylindrical ring contacting said filter cup interior surface.

11. The filter cartridge of claim 8, wherein said housing container top end comprises a flange with an upper sealing surface and the cover outer flange has a lower sealing surface contacting and sealing with said sealing surface of the housing container top end flange.

12. A filtration system for removing inorganic and organic contaminants from drinking water, comprising:

a filter cartridge;

a filtration unit comprising an upper reservoir for receiving unfiltered water, a lower reservoir for receiving filtered water, a support means for supporting said filter cartridge near a bottom area of said upper reservoir; wherein said filter cartridge comprises:

a housing having a top, a bottom, a sidewall, a housing inner space, at least one air vent in said sidewall near said top, a water inlet near said top and a water outlet near said bottom; and a filter received in said housing inner space, the filter comprising a porous plastic layer having an inlet side, an outlet side, and pores with a median pore size in the range of 10–20 microns which form a matrix of tortuous pathways for retaining water-borne parasites;

wherein said inlet side of the porous plastic layer is in fluid communication with the housing water inlet and said outlet side of the porous plastic layer is in fluid communication with the housing water outlet wherein gravity is the only force used to pull the unfiltered water from the upper reservoir, through the housing water inlet, the porous plastic layer, and the housing water outlet, to the lower reservoir.

13. The water filtration system of claim 12, wherein the filter further comprises granular filter media received in at least some of said porous plastic layer pores.

14. The water filtration system of claim 13, wherein the granular filter media in said pores comprises activated carbon.

15. The water filtration system of claim 12, wherein the filter further comprises granular filter media received in the inner space of the housing and adjacent to said porous plastic layer.

16. The water filtration system of claim 15, wherein the granular filter media received in the inner space of the housing is activated carbon.

17. The water filtration system of claim 12, wherein the pores of the porous plastic layer have a median pore size of about 15 microns.

18. The water filtration system of claim 12, further comprising a wafer impregnated with iodine positioned between said water inlet and said filter.

19. The water filtration system of claim 12, further comprising an anti-bacterial agent blended into the porous plastic material.

20. A filter cartridge for use in a gravity-flow filtration unit for removing water-borne parasites from water, the filter cartridge comprising:

a housing having a body and a cap, the body having a top end, a bottom end, a body sidewall with an inner surface defining an inner space, an opening near the body top end for access to the inner space, an opening near the body top end for access to the inner space, and an outlet near the body bottom end, and wherein said cap covers said body top end and has a central axis, an outer flange, and a water inlet perforating said cap near said central axis, and an open-topped filter cup having a cup wall comprising a cup sidewall and a cup bottom wall positioned near said body bottom end, said cup wall having an interior surface in fluid communication with said housing body water outlet, said cup wall comprising a porous plastic layer 0.25–0.50 inch thick and having pores with an average pore size in the range of 10–20 microns for allowing flow of liquid through the pores of the porous plastic layer under force of gravity and for retaining parasites in the porous plastic layer; and wherein the body sidewall comprises an air vent and a plurality of protrusions extending radially inward from the body sidewall inner surface contacting and frictionally engaging said cup sidewall outer surface, for securing said filter cup in said housing body;

whereby unfiltered liquid flows through said cap water inlet, into the filter cup interior space, through the filter cup wall, and out of the housing through the housing body water outlet.

21. The filter cartridge of claim 20, wherein the cap comprises a means for securing the cap to the filter cartridge comprising a downwardly-extending member which extends into the filter cup interior space and frictionally engages the cup interior surface.

22. The filter cartridge of claim 21, wherein the filter cup sidewall is generally cylindrical, and the cap downwardly-extending member is generally cylindrical rig contacting the cup interior surface.

23. The filter cartridge of claim 20, wherein the housing body top end comprises a flange with an upper sealing surface and the cap outer flange has a lower sealing surface contacting and sealing with the sealing surface of the housing body top end flange.

\* \* \* \* \*